H. K. SCHOENHEITER.
BRAKE SHOE.
APPLICATION FILED JUNE 24, 1916.
1,317,732.
Patented Oct. 7, 1919.
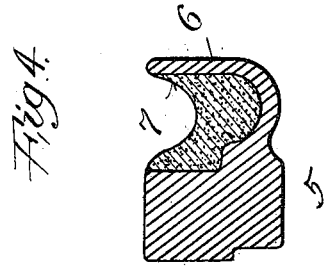
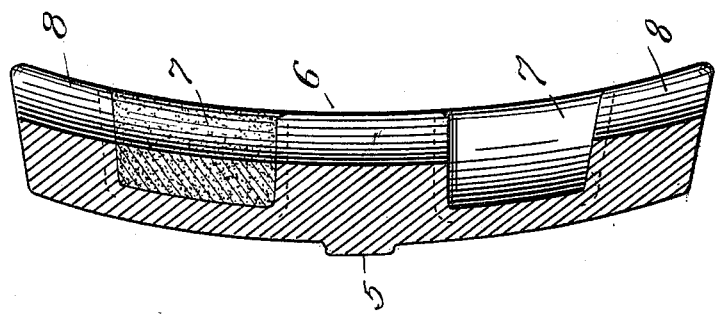
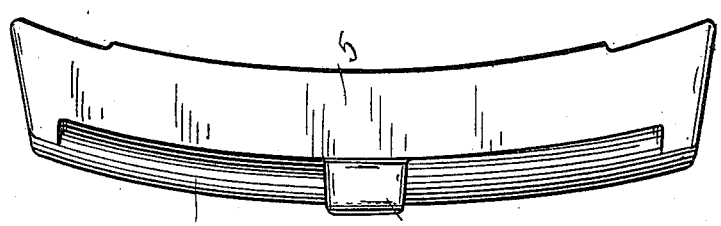
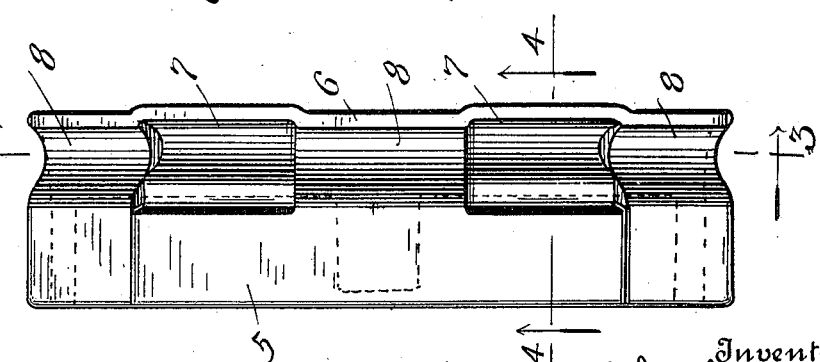
Inventor
Herman K. Schoenheiter
By his Attorney
Samuel E. Darby

UNITED STATES PATENT OFFICE.

HERMAN K. SCHOENHEITER, OF BALTIMORE, MARYLAND, ASSIGNOR TO THE AMERICAN BRAKE SHOE AND FOUNDRY COMPANY, OF WILMINGTON, DELAWARE, A CORPORATION OF DELAWARE.

BRAKE-SHOE.

1,317,732.   Specification of Letters Patent.   Patented Oct. 7, 1919.

Application filed June 24, 1916. Serial No. 105,740.

*To all whom it may concern:*

Be it known that I, HERMAN K. SCHOENHEITER, a citizen of the United States, residing at Baltimore, State of Maryland, have made a certain new and useful Invention in Brake-Shoes, of which the following is a specification.

This invention relates to brake shoes of the type having a body portion formed from cast iron and adapted to contact with the tread of a car wheel, and a flange portion adapted to contact with the flange of the wheel, and commonly referred to as a flange shoe.

The object of the invention is to provide means for lubricating the flange portion of the wheel so that the noise and heat incident to the application of the brakes to the wheel, and the injury, such as the cracking of the flange portion of the wheel resulting therefrom is eliminated.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claim.

Referring to the drawing:—

Figure 1 is a bottom face view of a brake shoe embodying my invention.

Fig. 2 is a view in side elevation of the same.

Fig. 3 is a sectional view taken on the line 3—3, Fig. 1 and looking in the direction of the arrows, one of the pockets however being filled with a lubricant.

Fig. 4 is a sectional view taken on the line 4—4, Fig 1, and looking in the direction of the arrows, the pocket however being shown as containing a lubricant.

The same part is designated by the same reference numeral where it occurs throughout the several views.

In the use of the flanged brake shoes of the kind and style heretofore in use, the comparatively thin flange of the wheel becomes excessively heated when the shoe is applied to the wheel, the effect of such being to injure the flange as by causing cracks to form and develop therein.

Further, due to the friction between the respective metals, an extremely objectionable noise is frequently the result especially if the car is on a turn, or a curved portion of track. It is among the special purposes of my present invention to provide a flanged brake shoe, of such construction as to automatically lubricate the flange portion of the wheel thereby preventing the friction noises and preventing the excessive heating thereof.

In accomplishing the objects of my invention I provide the body portion 5 of the brake shoe, adapted to contact with the tread of a car wheel and preferably formed from cast iron. The shoe is provided with a flange 6.

The flange 6 is formed to contain therein one or more portions 8, of slight depth and adapted to engage the flange of the wheel. Although I show three of such wheel flange contact portions. my invention is not to be limited thereto.

Between the wheel flange contact portions 8 of the flange 6, are comparatively deeply depressed flange portions 7, adapted to receive and retain therein packing of any description, such as metallic or non-metallic composition oil saturated waste, or the like. These depressed flange portions or recesses, as best shown in Figs. 1 and 4, while located for the most part in the flange portion of the shoe, extend a short distance into the tread portion thereof; from which it follows that the lubrication of the flange accomplished by the construction referred to is not limited to the flange only, and that the car wheel with which the brake shoe is used is lubricated at the portion thereof at which the flange merges with the tread, which is the portion of the wheel at which the application of a lubricant is necessary in order to avoid the objectionable features hereinbefore referred to.

Having now set forth the objects and nature of my invention, and having shown and described one structure embodying the principles thereof, what I claim as new and useful and of my own invention, and desire to secure by Letters Patent, is—

A brake shoe consisting of a body portion and a flange portion, said flange portion provided with pockets which extend a relatively short distance only into the body portion of said shoe, a lubricant in said pockets adapted to contact with and lubricate the flange of a wheel and to contact with and lubricate only that portion of the wheel where the tread merges with the flange.

In testimony whereof I have hereunto set my hand in the presence of a subscribing witness on this 14th day of June, A. D. 1916.

HERMAN K. SCHOENHEITER.

Witness:
WILMER B. BOUMAN.